United States Patent [19]

Adiletta et al.

[11] Patent Number: 5,159,568
[45] Date of Patent: Oct. 27, 1992

[54] HIGH SPEED PARALLEL MULTIPLIER CIRCUIT

[75] Inventors: Matthew J. Adiletta, Worcester; Stephen C. Root, Westboro, both of Mass.

[73] Assignee: Digital Equipment Corporation, Maynard, Mass.

[21] Appl. No.: 124,926

[22] Filed: Nov. 24, 1987

[51] Int. Cl.$^5$ .............................................. G06F 7/52
[52] U.S. Cl. ................................................ 364/758
[58] Field of Search ......................... 364/754, 757, 758

[56] References Cited

U.S. PATENT DOCUMENTS

| | | | |
|---|---|---|---|
| 3,691,359 | 9/1972 | Dell et al. | 364/758 |
| 4,463,439 | 7/1984 | Weinberger | 364/784 |
| 4,736,335 | 4/1988 | Barkan | 364/758 |

OTHER PUBLICATIONS

Habibi et al., "Fast Multipliers," IEEE Transactions on Computers, vol. C-19, No. 2, pp. 153-157 (1970).
MacSorley, "High-Speed Arithmetic in Binary Computers," Proceedings of the IRE, vol. 49, No. 1, pp. 67-80 (1961).
Baugh et al., "A Two's Complement Parallel Array Multip. Algorithm", IEEE Trans. on Computers, vol. C-22, No. 12, Dec. 1973, pp. 1045-1047.
Dadda, "On Parallel Digital Multipliers," Alta Freq. 45:574-580 (1976) pp., 126-132.
Wallace, "A Suggestion for a Fast Multiplier," IEEE Trans. Electron, Comput., EC-13:14-17 (1964), pp. 114-117.
Dadda, "Some Schemes For Parallel Multipliers," Alta Freq. 34:349-356 (1965), pp. 118-125.

Primary Examiner—Tan V. Mai
Attorney, Agent, or Firm—Finnegan, Henderson, Farabow, Garrett and Dunner

[57] ABSTRACT

The binary multiplier circuit for obtaining a product of a M-bit multiplier and a N-bit multiplicand includes a multiplier circuit which produces a matrix of original summand bits having M rows and M+N columns and a matrix reduction circuit. In the matrix reduction circuit, for every column of the matrix having three or more original summand bits, groups of three bits are input into full adder circuits which output a sum bit for that column and a carry bit for the column in the next most significant bit position. For every column having three or fewer original summand bits, and having the least significant column position that is not yet reduced to two or fewer bits, groups of two bits are input into a half adder circuit which outputs a sum bit for that column and carry bit for a column in the next most significant bit position. Iterative reductions are performed for each column by using full adder circuits for every group of three bits in a column and by using a half adder circuit for any remaining group of two bits in a column. The reduction continues until each column of the matrix is reduced to two or fewer bits. The remaining two rows of bits can be input to a carry-propagating adder circuit to output a sum equal to the product.

8 Claims, 7 Drawing Sheets

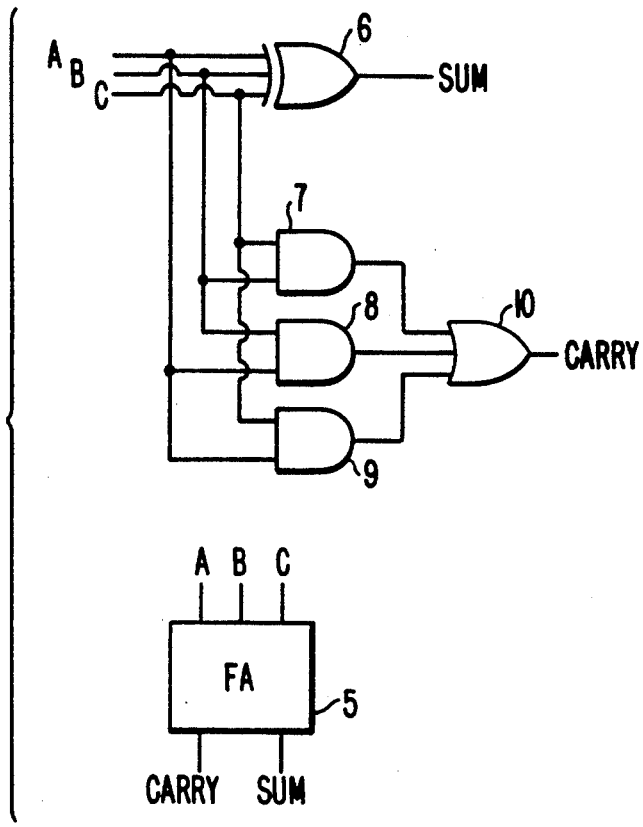
FIG. 2A.
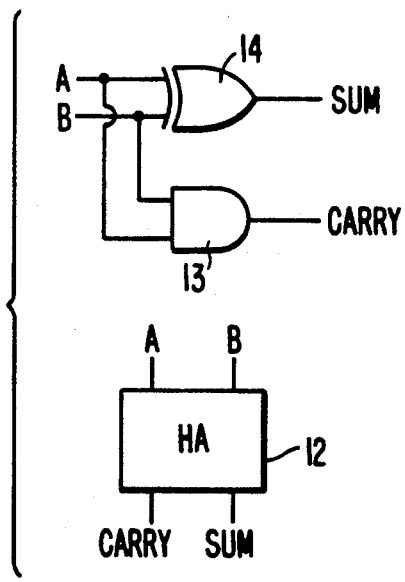
FIG. 2B.
FIG. 6.
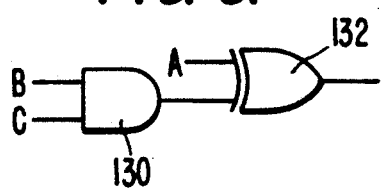

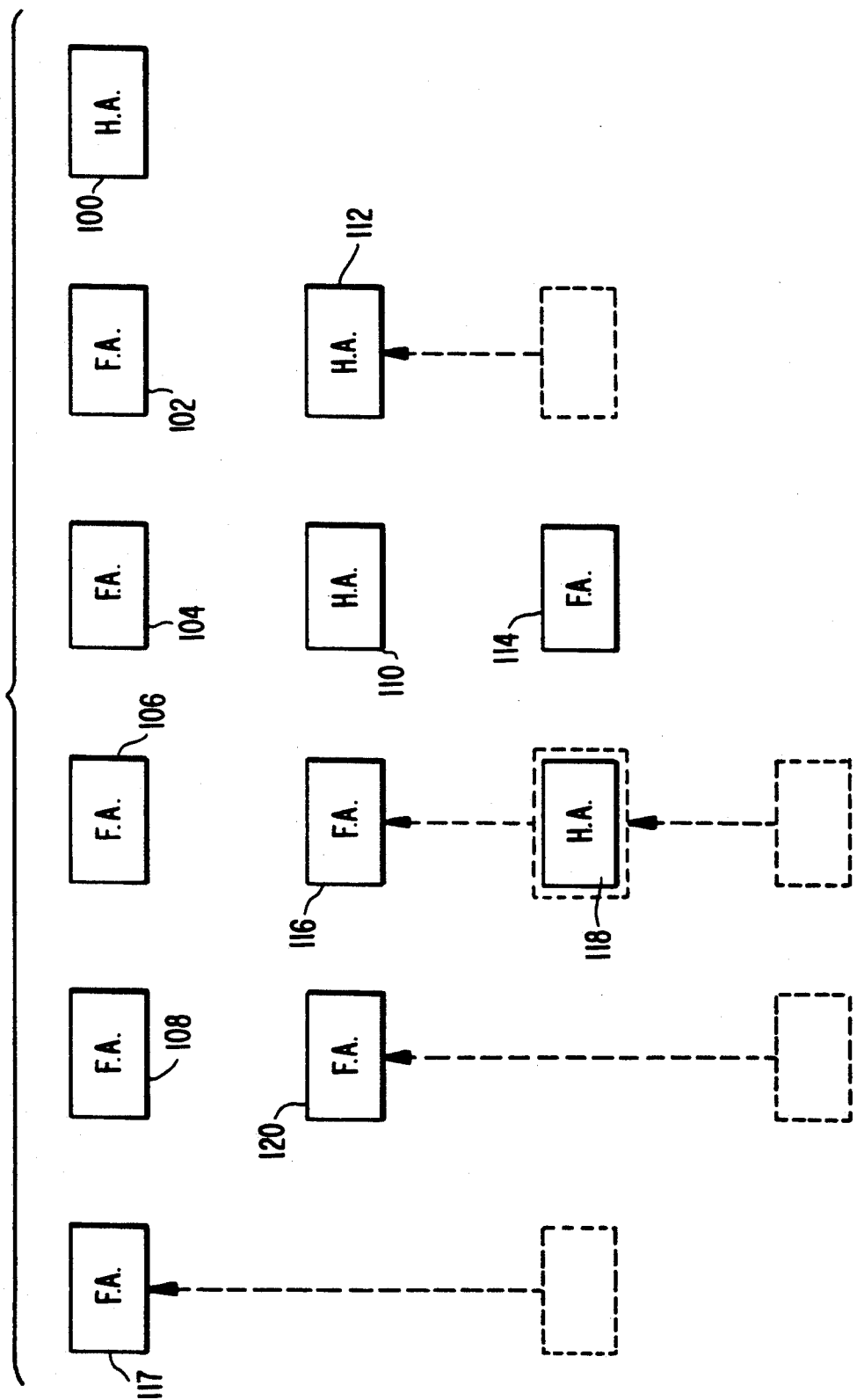

(figure content — triangular array of numeric/letter codes)

HIGH SPEED PARALLEL MULTIPLIER CIRCUIT

BACKGROUND OF THE INVENTION

The present invention relates to high speed parallel multiplier circuits.

In binary multiplication, a N+M bit product $[P=(p_{m+n}, p_{m+n-1}, \ldots p_1)]$ is formed by multiplying an N-bit multiplicand $[A=(a_n, a_{n-1}, \ldots a_1)]$ by an M-bit multiplier $[B=(b_m, b_{m-1}, \ldots b_1)]$. The multiplication is illustrated in FIG. 1 which shows the product P as the sum of corresponding elements of a summand matrix 1. The summand matrix 1 has M×N original entries of partial product or summand matrix bits which are each the logical AND of a different pair of multiplier and multiplicand bits.

If the addition of the summand matrix bits was to be performed in a single logical level in order to obtain the product P, such a sum could be obtained by using a parallel adder circuit for each column. The inputs to the ith adder (for the ith column) would include the original summand matrix bits in the ith column and also include the carry outputs from the lower order adders. This method for addition of the summand matrix has serious drawbacks. First, parallel adders for a large number of inputs are difficult to implement. Second, they have a large amount of delay associated with them due to the propagation of carries along the chain of parallel adders from the least significant bit position to the most significant bit position and the addition of each bit has to occur in sequence from the least significant bit position to the most significant bit position. Therefore, the total time required to perform binary multiplication using this method for addition of the summand matrix becomes prohibitive.

There have been a number of attempts to increase the speed at which a digital computer can perform binary multiplication. These attempts involve accelerating the addition of the summand matrix bits. In general, such attempts focus on repetitive operations, called reductions, which reduce the number of summand matrix bits until there are two rows of bits (i.e., addends) whose sum equals the product. The reductions generally utilize several logical "levels" of adder circuits each corresponding to a different column of the summand matrix. Such adder circuits, for example, include full adders which produce a sum and carry bit from three inputs and half adders which produce a sum and carry bit from two inputs. Within each logical level of reduction no carry propagation is allowed, thus enabling many additions to occur simultaneously, instead of successively. When the summand matrix is reduced to two rows of bits, these two rows can be input into a full carry-propagating adder to obtain the product. Therefore, carry propagation is confined to the last step where it can be accomplished by high speed circuits.

The use of full and half adders as opposed to multiple input parallel adders significantly decreases the time required to perform binary multiplication. A full adder 5 is shown in FIG. 2A for operands A, B, and C and can be defined by the following two equations:

$$SUM = A \, XOR \, B \, XOR \, C$$

$$CARRY = (A \, AND \, B) \, OR \, (B \, AND \, C) \, OR \, (A \, AND \, C).$$

A half adder 12 is shown in FIG. 2B for operands A and B and can be defined by the following two equations:

$$SUM = A \, XOR \, B$$

$$CARRY = A \, AND \, B.$$

As shown in FIG. 2A, full adder circuit 5 is equivalent to a 3-input exclusive OR gate 6 connected to receive bits A, B, and C and outputting a SUM bit, three 2-input AND gates 7 to 9 and a 3-input OR gate 10 10 which outputs a CARRY BIT. AND gate 7 is connected to receive bits B and C, AND gate 8 is connected to receive bits A and B, and AND gate 9 is connected to receive bits A and C. The outputs from AND gates 7, 8, and 9 become inputs for OR gate 10.

As illustrated in FIG. 2B, half adder circuit 12 is equivalent to a 2-input exclusive OR gate 14 connected to receive bits A and B and outputting a SUM bit and a 2-input AND gate connected to receive bits A and B and outputting a CARRY bit. The logical definition of parallel adders having more than three inputs is quite complex. Parallel adders are, therefore, generally difficult to fabricate.

One prior summand matrix reduction scheme utilizing the above principles, described in "A Suggestion for a Fast Multiplier," C. S. Wallace, Vol. 13, No. 14, *IEEE Transactions on Electronic Computers* (Feb. 1964), proposes grouping the summand matrix bits in each column of the matrix into groups of three bits and using full adders to add the groups of three bits or half adders if only two bits for a given column remained. The adders produced a sum bit for the same column and a carry bit for the column with the next most significant bits. The groups of bits are added in each column (including in later groupings the sum and carry bits from previous groupings) until the summand matrix is reduced to two rows of bits, one row representing a row of sum bits and one row representing a row of carry bits. The two rows are then input into a traditional carry-propagating adder which can perform a fast addition operation based on a carry-lookahead design.

The rule for the Wallace method of reduction is to reduce the columns as much as possible as soon as possible, and to utilize as many full adders as possible. The Wallace method of summand reduction is illustrated in FIG. 3 for a 5×5 bit multiplier circuit. The original entries in the summand matrix are represented as $a_1b_1$, $a_2b_1$, etc., as shown in FIG. 1. The reduction of the 5×5 matrix to two rows of bits requires three logical levels of reduction.

In the first logical level of reduction, level I, each column of the summand matrix with at least three bits is divided into groups of three bits and each group of three bits is then input into a full adder. For example, $a_1b_2$, $a_2b_2$, and $a_3b_1$ are input to full adder 15 which produces a sum bit and a carry bit that are inputs to gates at the second logical level of reduction, level II. In this manner, three input bits are reduced to two output bits at level I. Similarly, $a_2b_3$, $a_3b_2$, and $a_4b_1$ are input to full adder 17 which outputs a sum bit and a carry bit; $a_3b_3$, $a_4b_2$, and $a_5b_1$ are input to full adder 19 which outputs a sum bit and a carry bit; $a_1b_5$ and $a_2b_4$ remain in column 5 and are input to half adder 25 which outputs a sum bit and a carry bit; $a_3b_4$, $a_4b_3$, and $a_5b_2$ are input to full adder 21 which outputs a sum bit and a carry bit; and $a_3b_5$, $a_4b_4$, and $a_5b_3$ are input to full adder 23 which outputs a sum bit and a carry bit. All sum bits and carry bits output from the level I gates are inputs to gates in level II.

In the level II reduction, full adder 27 receives as inputs an original entry in the summand matrix, $a_1b_4$, the sum bit from full adder 17 and the carry bit from full adder 15 as inputs. From these inputs full adder 27 produces a sum bit and a carry bit which are routed to gates at the third logical level of reduction, level III. Similarly, full adder 29 receives as inputs the carry bit from full adder 17, the sum bit from full adder 19, and the sum bit from half adder 25 and produces a sum bit and a carry bit which are routed to gates at level 111. Full adder 31 receives as inputs the carry bit from half adder 25, the carry bit from full adder 19, and the sum bit from full adder 21 and produces as outputs a sum bit and a carry bit which are routed to gates at level III. Finally in level II, full adder 33 receives as inputs original summand entries $a_4b_5$, and $a_5b_4$ (they were part of a column with only two entries), and the carry bit from full adder 23 and produces as outputs a sum bit and a carry bit which are routed to gates at level III. After the reduction in level II, most of the columns have only two bits remaining. For the ones that do not, an additional level of reduction is required using full adders or half adders depending upon the number of remaining bits.

In the level III reduction, half adder 35 receives as inputs an original entry in the summand matrix, $a_2b_5$, and the sum bit from full adder 31 and produces as outputs a sum bit and a carry bit. Full adder 37 receives as inputs the sum bit from full adder 23, the carry bit from full adder 21 and the carry bit from full adder 31 and produces as outputs a sum bit and a carry bit. After level III, the original summand matrix is reduced to a set of two rows of bits. These remaining bits are then input into a carry-lookahead adder 40 to produce the product.

As illustrated in FIG. 3, ten full adders and two half adders are used to reduce the original summand matrix to two rows of bits. As the number of bits of the multiplicand and multiplier increases, the number of adders required to reduce the summand matrix also increases. Also, the increased hardware and wires required to implement this reduction scheme creates problems due to the difficulty of routing inputs to the adders at the various logical levels of reduction. As a result of the hardware and wire increases, the speed of performance decreases due to the increased delays in the hardware and wires, the uneven distribution in the density of wires, and the complex routing scheme.

Another prior summand matrix reduction scheme, proposed in "Some Schemes For Parallel Multipliers," L. Dadda, Vol. 34, *Alta Frecuenza* (March 1965), postulates that only the minimum number of inputs from the summand matrix should be reduced at each logical level of reduction. The Dadda scheme begins with the goal of reducing a summand matrix to two rows of bits. The Dadda scheme then works backward and calculates that two rows result from the reduction of three rows; three rows are transformed from six rows; six rows can be reduced from nine rows; nine rows are transformed from thirteen rows; thirteen rows are transformed from nineteen rows; etc. Thus, this scheme results in the following series:

2; 3; 6; 9; 13; 19; 28; 42; 63 . . .

This scheme postulates that with each logical level of reduction, the columns should only be reduced to the point of the next lower number in the series by using full adders and half adders. This scheme uses fewer gates on the first logical level of reduction. The goal of the scheme is fewer total gates than the first reduction scheme mentioned above with reference to FIG. 3 as a way to increase speed.

The second reduction scheme is illustrated in FIG. 4. At the level I reduction, half adder 50 receives as inputs $a_5b_1$ and $a_4b_2$ and outputs a sum bit and a carry bit which are routed to gates at level II. Half adder 52 receives as inputs $a_4b_3$ and $a_5b_2$ and outputs a sum bit and a carry bit which are routed to gates at level II.

At the level II reduction, half adder 54 receives as inputs $a_3b_2$ and $a_4b_1$ and outputs a sum bit and a carry bit which are routed to gates at level III. Full adder 56 receives as inputs $a_2b_4$, $a_3b_3$, and the sum bit from half adder 50 and outputs a sum bit and a carry bit. Full adder 58 receives as inputs $a_3b_4$, the sum bit from half adder 52, and the carry bit from half adder 50 and outputs a sum bit and a carry bit. Full adder 60 receives as inputs $a_4b_4$, $a_5b_3$, and the carry bit from half adder 52 and outputs a sum bit and a carry bit which are routed to gates at level III.

At the level III reduction, half adder 62 receives as inputs $a_2b_2$, $a_3b_1$ and outputs a sum bit and a carry bit. Full adder 64 receives as inputs $a_1b_4$, $a_2b_3$, and the sum bit from half adder 54 and outputs a sum bit and a carry bit. Full adder 66 receives as inputs $a_1b_5$, the sum bit from full adder 56, and the carry bit from half adder 54 and outputs a sum bit and a carry bit. Full adder 68 receives as inputs $a_2b_5$, the sum bit from full adder 58, and the carry bit from full adder 56 and outputs a sum bit and a carry bit. Full adder 70 receives as inputs $a_3b_5$, the sum bit from full adder 60, and the carry bit from full adder 58 and outputs a sum bit and carry bit. Full adder 72 receives as inputs $a_4b_5$, $a_5b_4$ and the carry bit from full adder 60 and outputs a sum bit and a carry bit. The summand matrix is then reduced to a set of two rows of bits which can be input into carry-lookahead adder 74 to produce the product of the original multiplicand and multiplier.

In this scheme, as illustrated in FIG. 4, a large number of original summand matrix bits are reserved to be input directly into carry-lookahead adder 74. A smaller number of original summand matrix bits is input into the adders at level I than in the reduction scheme mentioned above with reference to FIG. 3. This scheme employs eight full adders and four half adders to reduce a 5×5 summand matrix to two rows of numbers. Although the amount of hardware required to implement the design is less than used in the scheme illustrated in FIG. 3, the routing of inputs to the adders and the wiring of the circuit is still quite complex and results in performance delay.

Both the Wallace and Dadda schemes recognize the need for a fast binary multiplier circuit. However, neither scheme recognizes the advantages of the use of an increased number of half adders as opposed to full adders for an increase in speed and a decrease in space required. Half adders have several advantages over full adders. For example, the use of an increased number of half adder circuits reduces the propagation delay associated with the overall summand reduction because full adders are a more complex and slower device. Furthermore, use of half adder circuits, as opposed to full adder circuits, reduces the area required on a circuit board for the gate layout since a half adder circuit only requires approximately one-quarter of the area required for a full adder circuit. Also, a half adder circuit requires less power than a full adder circuit. Furthermore, neither scheme recognizes the problems associated with the crossing of wires and the routing of inputs to the gates for summand matrix reduction.

SUMMARY OF THE INVENTION

It is, accordingly, an object of the present invention to provide a high speed parallel binary multiplier circuit which utilizes a small amount of hardware and wires and an increased number of half adders, performs a fast summand matrix reduction operation, and which can be easily and efficiently implemented in design.

Additional objects and advantages of the invention will be set forth in part in the description which follows, and in part will obvious from the description or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the binary multiplier circuit for obtaining a product of a M-bit multiplier and a N-bit multiplicand of this invention, comprises: binary multiplier means, having inputs connected to receive the multiplier and the multiplicand, for producing a summand matrix having $M \times N$ original summand matrix bits and having M rows and M+N columns, the columns each representing a different bit position in the product and being arranged in significance according to increasing bit positions of the product; reduction circuit means, coupled to the binary multiplier means, for producing two addends from the summand matrix bits, the reduction circuit means including a first level adder circuit coupled to receive the original summand matrix bits, the first level adder circuit including a first set of full adders each corresponding to a selected one of the columns of the summand matrix having three or more original summand matrix bits, except for the one of the columns representing the least significant bit position with only three original summand matrix bits, each of the full adders being connected to receive three different original summand matrix bits from the corresponding column and including means for producing a sum bit for that column and a carry bit for the column representing the next most significant bit position, and a first set of half adders each corresponding to a selected one of the columns of the summand matrix initially having more than three original summand matrix bits and having exactly two original summand matrix bits not connected to one of the full adders in the first set, and for the one of the columns representing the least significant bit position with only three original summand matrix bits, the half adders each being connected to receive two different original summand matrix bits from the corresponding column and including means for producing a sum bit for that column and a carry bit for the column representing the next most significant bit position, and an intermediate level adder circuit coupled to receive either original summand matrix bits not received by the first set of half adders or full adders, or sum and carry bits from the first set of full adders and half adders, the intermediate level adder circuit being organized into a plurality of different levels and receiving column bits including, for a corresponding column and level, the original summand matrix bits not received by the first set of half or full adders and sum and carry bits which were not inputs at a prior level, the intermediate level adder circuit including a plurality of full adders each corresponding to one of the levels and to a selected one of the columns having more than three column bits, except for the one of the columns at the corresponding level representing the least significant bit position with only three original summand matrix bits, each of the full adders at each of the levels being connected to receive three column bits for the corresponding column and including means for producing a sum bit for that column and a carry bit for the column representing the next most significant bit position, and a plurality of half adders each corresponding to one of the levels and to a selected one of the columns for which, at each of the intermediate levels, at least one of the plurality of full adders from the first set or from the intermediate level adder circuit corresponds to that column and exactly two bits remain unconnected to any of the full adders, and also corresponding to the one of the columns at each level representing the least significant bit position for which only three bits remain, the half adders each being connected to receive two column bits for the corresponding column, each of the plurality of half adders including means for producing a sum bit for that column and a carry bit for the column representing the next most significant bit position; and full carry-propagating adder means, receiving as inputs the addends which are output from the intermediate level adder circuit, for producing the product.

The accompanying drawings, which are incorporated in and constitute a part of this specification, illustrate one embodiment of the invention and, together with the description, serve to explain the principles of the invention.

BRIEF DESCRIPTION OF THE DRAWINGS

FIG. 2A is a logic circuit and a block diagram of a full adder;

FIG. 2B is a logic circuit and a block diagram of a half adder;

FIG. 6 is a logic circuit diagram of a circuit for converting original summand matrix bits represented in two's complement format to magnitude encoded format for use in the reduction circuit of the present invention;

FIG. 7 is a diagram illustrating a gate layout and wiring scheme for the binary multiplier circuit of FIG. 5 in accordance with a preferred embodiment of the present invention; and FIG. 8 is a diagram illustrating a gate layout and wiring scheme for a $32 \times 32$ bit summand matrix in accordance with the present invention.

DESCRIPTION OF THE PREFERRED EMBODIMENT

Figure 1:
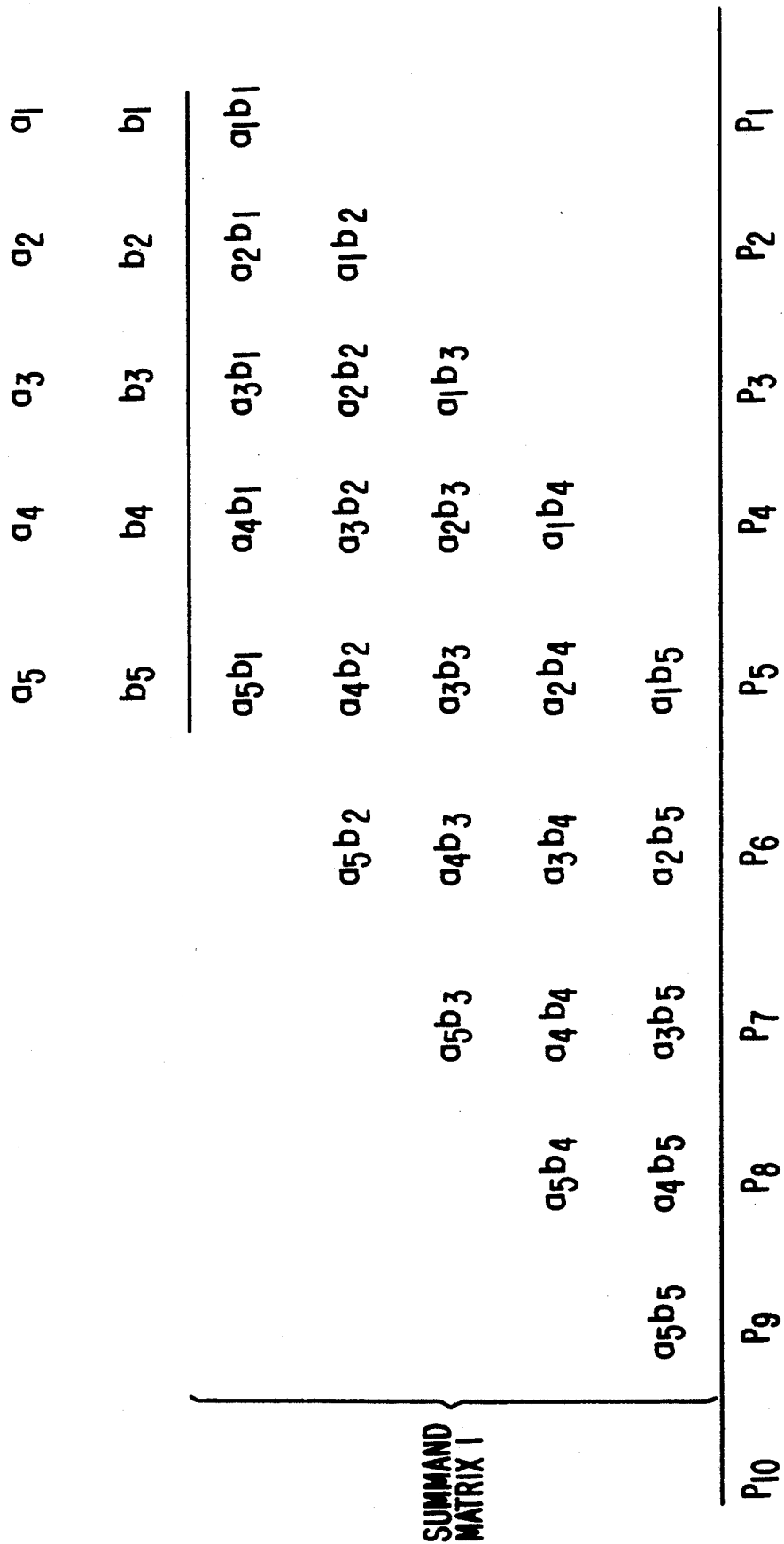
FIG. 1 is a diagram of a summand matrix from a 5-bit multiplier and a 5-bit multiplicand.

Reference will now be made in detail to the presently preferred embodiment of the invention, an example of which is illustrated in the accompanying drawings in which like reference characters refer to corresponding elements.

The binary multiplier circuit of the present invention performs a fast summand matrix reduction operation by maximizing use of half adders and can be implemented easily and efficiently with a small amount of wires by using an easy input routing scheme. The summand matrix reduction operation of the present invention reduces as many original summand matrix bits at the lowest logical level of reduction as possible in order to minimize the number of wires required. The multiplier circuit of the present invention operates to deliver a maximum number of the least significant bits of the sum and carry vectors at one gate delay before the final sum and carry vectors are computed to full carry propagate adder circuitry. This enables the invention to employ two full carry propagate adders to add the final two rows of bits; one of the adders being M bits wide and one of the adders being N bits wide. The least significant bit positions are input to one of the adders at one gate delay earlier than the more significant bit positions to compensate for the propagation delay in the reduction of the more significant bit positions to two rows before these bits can be input to a carry propagate adder. This implementation increases the speed of operation.

Figure 5:
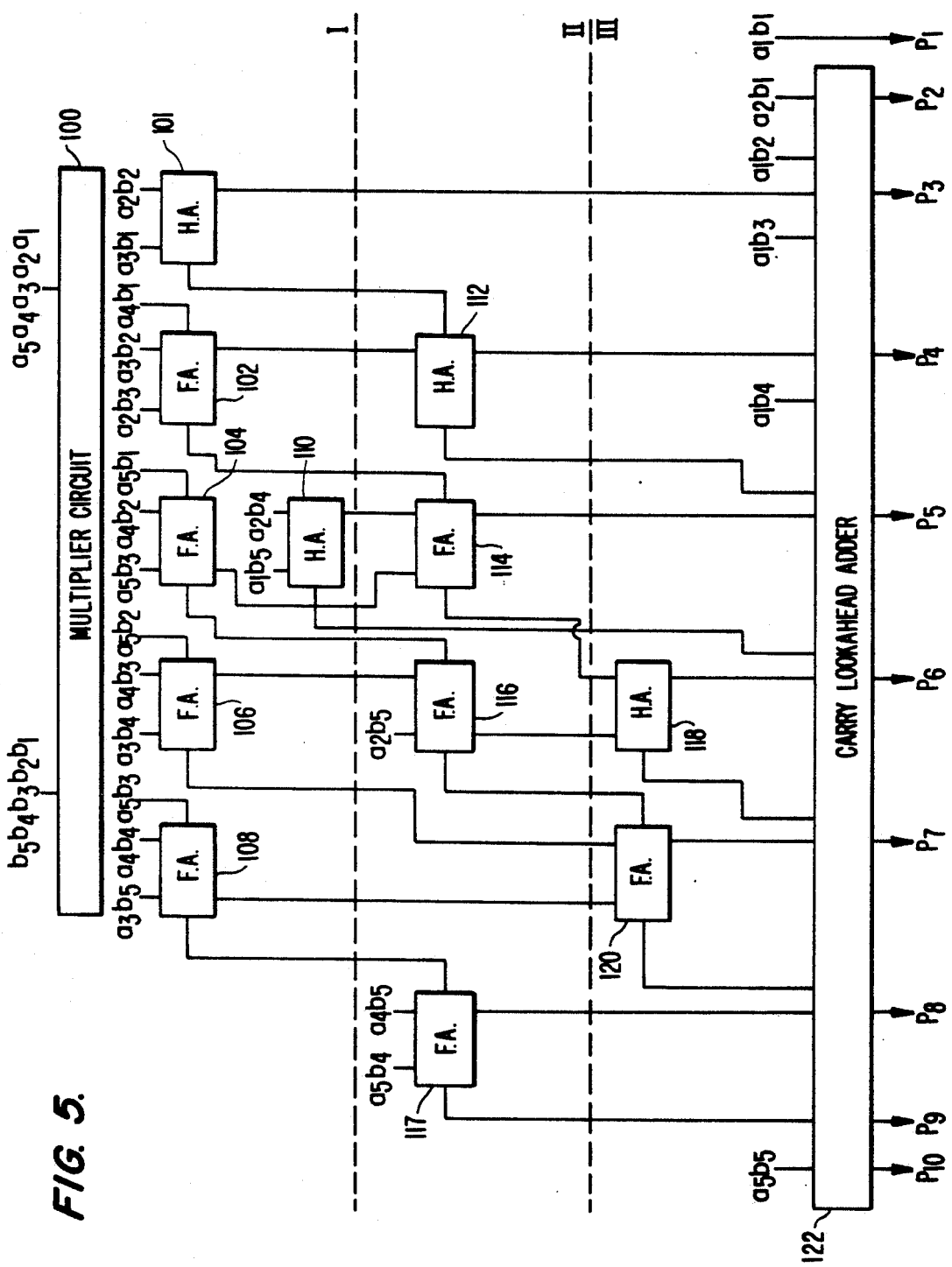
FIG. 5 is a block diagram illustrating portions of a binary multiplier circuit in accordance with a preferred embodiment of the present invention.

FIG. 5 is a general block diagram illustrating a preferred embodiment of the binary multiplier circuit of the present invention for obtaining a product of an M-bit multiplier and an N-bit multiplicand. FIG. 5 represents a functional description of the present invention and does not constitute a limitation on the positional implementation of the present invention, which will be described in more detail with reference to FIG. 7. In accordance with the present invention, the binary multiplier circuit of the present invention includes binary multiplier means, having inputs connected to receive the multiplier and the multiplicand, for producing a summand matrix having $M \times N$ original summand matrix bits and having $M+N$ columns, the columns each representing a different bit position in the product and being arranged in significance according to increasing bit positions of the product.

As embodied in FIG. 5, multiplier circuit 100 receives as inputs the multiplicand, $a_5a_4a_3a_2a_1$, and the multiplier, $b_5b_4b_3b_2b_1$, and produces a summand matrix of original summand matrix bits having five rows and ten columns. Each original summand matrix bit represents the result of a logical AND operation of a different combination of one bit of the multiplier and one bit of the multiplicand, as shown in FIG. 1.

The present invention employs the following rules in order to reduce the original summand matrix bits to a point where two rows of bits (i.e., the addends) are obtained. One row represents the sum bits and one row represents the carry bits. Their sum equals the product of the original multiplier and multiplicand. In accordance with the present invention, the binary multiplier circuit includes reduction circuit means, coupled to the binary multiplier means, for producing two addends from the summand matrix bits. The reduction circuit means includes a first level adder circuit coupled to receive the original summand matrix bits. That circuit includes a first set of full adders each corresponding to a selected one of the columns of the summand matrix having three or more original summand matrix bits, except for the column representing the least significant bit position with only three original summand matrix bits. Each of the full adders is connected to receive three different bits from the corresponding column and includes means for producing a sum bit for that column and a carry bit for the column representing the next most significant bit position.

The first level adder circuit also includes a first set of half adder circuits each corresponding to a selected one of the columns initially having more than three original summand matrix bits and having exactly two original summand matrix bits not connected to one of the full adders in the first set and for the one of the columns representing the least significant bit position with only three original summand matrix bits. Each of the half adders is connected to receive two different original summand matrix bits from the corresponding column. The half adders include means for producing a sum bit for that column and a carry bit for the column representing the next most significant bit position.

As illustrated in FIG. 5, column 1 of the summand matrix contains only one original summand matrix bit, $a_1b_1$, and, therefore, does not require any further reduction since the column has two or one bit, and does not require the use of a full adder circuit or a half adder circuit. Column 2 includes two original summand matrix bits, $a_1b_2$ and $a_2b_1$, and therefore also does not require any further reduction by using a full adder or a half adder. Column 3 includes three original summand matrix bits and therefore, requires a half adder circuit 101, since it is the least significant bit position with only three original summand matrix bits. Half adder 101 is connected to receive $a_3b_1$ and $a_2b_2$ and produces a sum bit equal to ($a_3b_1$ XOR $a_2b_2$) for column 3 and a carry bit equal to ($a_3b_1$ AND $a_2b_2$) for column 4, which represents the next most significant bit position. Column 3 now includes only two bits, the sum bit from half adder 101 and original summand matrix bit $a_1b_3$ and therefore will require no further reduction.

Column 4 includes four original summand matrix bits and therefore requires the use of full adder 102 which is connected to receive $a_2b_3$, $a_3b_2$, and $a_4b_1$. Full adder 102 produces a sum bit equal to ($a_2b_3$ XOR $a_3b_2$ XOR $a_4b_1$) for column 4 and a carry bit equal to ($a_2b_3$ AND $a_3b_2$) OR ($a_3b_2$ AND $a_4b_1$) OR $a_2b_3$ and $a_4b_1$) for column 5. Column 4 is now reduced to three bits for the next logical level of reduction.

Column 5 includes five original summand matrix bits and therefore requires full adder 104 which is connected to receive $a_3b_3$, $a_4b_2$, and $a_5b_1$. Full adder 104 produces a sum bit equal to ($a_3b_3$ XOR $a_4b_2$ XOR $a_5b_1$) for column 5 and a carry bit equal to ($a_3b_3$ AND $a_4b_2$) OR ($a_4b_2$ AND $a_5b_1$) OR ($a_3b_3$ AND $a_5b_1$) for column 6. The remaining two original summand matrix bits are input to half adder 110 since column 5 initially had more than three original summand matrix bits and has exactly two original summand matrix bits not connected to full adder 104 in level 1. Half adder 110 is connected to receive $a_1b_5$ and $a_2b_4$ and produces a sum bit for column 5 and a carry bit for column 6.

Column 6 includes four original summand matrix bits and therefore requires a full adder 106 which is connected to receive $a_3b_4$, $a_4b_3$, and $a_5b_2$ and produces a sum bit equal to ($a_3b_4$ XOR $a_4b_3$ XOR $a_5b_2$) to column 6 and a carry bit equal to ($a_3b_4$ AND $a_4b_3$) OR ($a_4b_3$ AND $a_5b_2$) OR ($a_3b_4$ AND $a_5b_2$) to column 7. The remaining one original summand matrix bit $a_2b_5$ from column 6 is routed to a gate for level II reduction.

Column 7 includes only three original summand matrix bits. A half adder circuit cannot be used for the reduction of column 7 because column 3 is the least most significant column position having exactly three bits. Instead, full adder 108 is used and is connected to receive $a_3b_5$, $a_4b_4$, and $a_5b_3$ to produce a sum bit for column 7 and a carry bit for column 8.

Column 8 includes two original summand matrix bits. These bits are routed to a gate for level II reduction. Column 9 includes one original summand matrix bit which is also routed to a gate for a later level of reduction.

The binary multiplier circuit, in accordance with the present invention, also includes an intermediate level adder circuit coupled to receive either original summand matrix bits not received by the first set of half adders or full adders or sum and carry bits from the first set of half adders or full adders and is organized into a plurality of different levels receiving column bits including, for a corresponding column and level, the original summand matrix bits not received by the first set of half or full adders and sum and carry bits which were not inputs at a prior level. The intermediate level adder circuit includes a plurality of full adders each corresponding to one of the levels and to a selected one of the columns having more than three column bits, except for the one of the columns at the corresponding level representing the least significant bit position with only three original summand matrix bits, each of the full adders at each of the levels is connected to receive three column bits for the corresponding column. Each of the plurality of full adders includes means for producing a sum bit for that column and a carry bit for the column representing the next most significant bit position.

The intermediate level adder circuit also includes a plurality of half adders each corresponding to one of the levels and to a selected one of the columns for which, at each of the intermediate levels, at least one of the plurality of full adders from the first set or from the intermediate level adder circuit corresponds to that column and exactly two bits remain unconnected to any of the full adders, and also corresponding to the one of the columns at each level representing the least significant bit position for which only three bits remain. The half adders are connected to receive two column bits from the corresponding column. Each of the half adders includes means for producing a sum bit for that column and a carry bit for the column representing the next most significant bit position. The intermediate levels of adder circuits are used until all columns are reduced to two or less bits.

As shown in FIG. 5, columns 1, 2 and 3 were previously reduced to two or one bit at level I. Column 4 includes a sum bit from full adder 102 and a carry bit from half adder 101. Half adder 112 is connected to receive these bits and produces a sum bit for column 4 and a carry bit for column 5. Column 4 is now reduced to two bits, original summand matrix bit $a_1b_4$ and the sum bit from half adder 112 and, therefore, requires no further reduction.

Column 5, at level II, includes three column bits, the carry bit from full adder 102, the sum bit from half adder 110, and the sum bit from full adder 104. These bits are input to full adder 114 which produces a sum bit for column 5 and a carry bit for column 6. Column 5 now includes two bits, the carry bit from half adder 112 and the sum bit from full adder 114 and therefore requires no further reduction.

At level II, column 6 includes four column bits, original summand matrix bit $a_2b_5$, the sum bit from full adder 106, the carry bit from full adder 104, and the carry bit from half adder 110. Therefore three bits, original summand matrix bit $a_2b_5$, the sum bit from full adder 106, and the carry bit from full adder 104, are connected to full adder 116 which produces a sum bit for column 6 and a carry bit for column 7. Column 6 now includes three bits which are routed to level III for reduction.

At level II, column 7 includes two column bits, the sum bit from full adder 108 and the carry bit from full adder 106 which are routed to a later level for reduction since a carry from column 6 will be input to column 7 in level II thereby necessitating further reduction of column 7.

Column 8, at level II, includes three column bits, original summand matrix bit $a_5b_4$, original summand matrix bit $a_4b_5$, and the carry bit from full adder 108. These bits are input to full adder 117 which produces a sum bit for column 8 and a carry bit for column 9. Column 8 now has one bit.

At level III, columns 1, 2, 3, 4, and 5 have two or one column bit and no further reduction is required at this level. Column 6 includes three bits, and is also the least most significant bit position for which only three bits remain. Therefore, half adder 118 is connected to receive the carry bit from full adder 114 and the sum bit from full adder 116 and produces a sum bit for column 6 and a carry bit for column 7. Column 6 is now reduced to two bits as only the carry bit from half adder 110 and the sum bit from half adder 118 remain.

At level III, column 7 includes three column bits, the carry bit from full adder 116, the carry bit from full adder 106, and the sum bit from full adder 108. Therefore, full adder 120 is connected to receive the bits and produces a sum bit for column 7 and a carry bit for column 8. Column 7 now includes the sum bit from full adder 120 and the carry bit from half adder 118.

At level III, column 8 includes the sum bit from full adder 117 and the carry bit from full adder 120 and, therefore, includes two or one column bit and requires no further reduction. Column 9 includes the carry bit from full adder 117 and original summand matrix bit $a_5b_5$ and also has two or one column bit.

Since all of the columns have been reduced to two or one bit no further reduction can take place. The remaining bits can be considered the two numbers, or addends, to be added to produce the product.

In accordance with the present invention, the binary multiplier circuit also includes full carry-propagating adder means, receiving as inputs the addends which are output from the intermediate level adder circuit, for producing the product. As embodied in FIG. 5, full carry-propagating adder means includes a standard M+N bit carry lookahead adder 122 which adds the remaining addends in a manner known to those skilled in the art of design of full carry-propagating adders, and outputs a sum equal to the product of the original multiplier and multiplicand.

Figure 3:
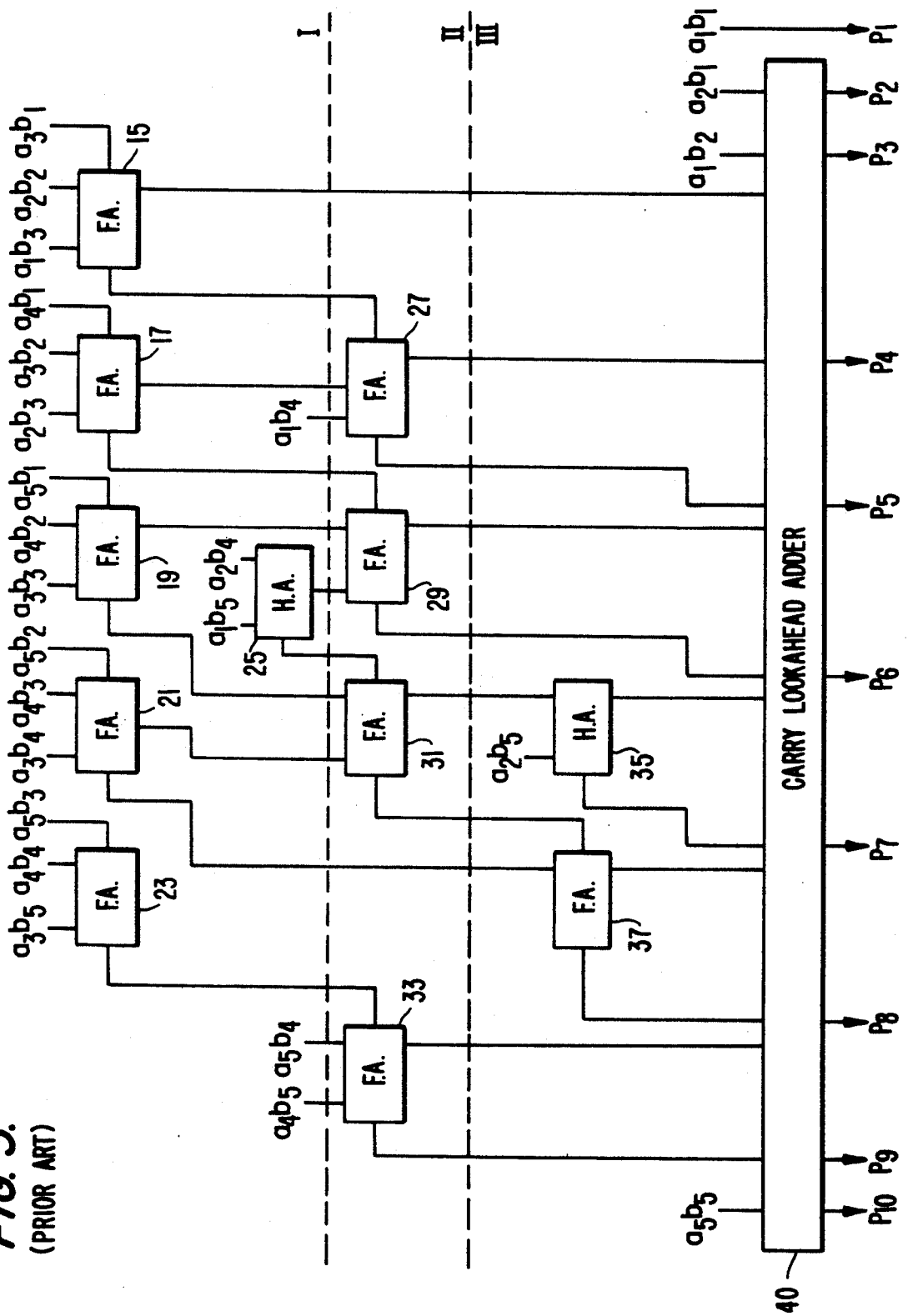
FIG. 3 is a block diagram of one conventional method of summand matrix reduction.
Figure 4:
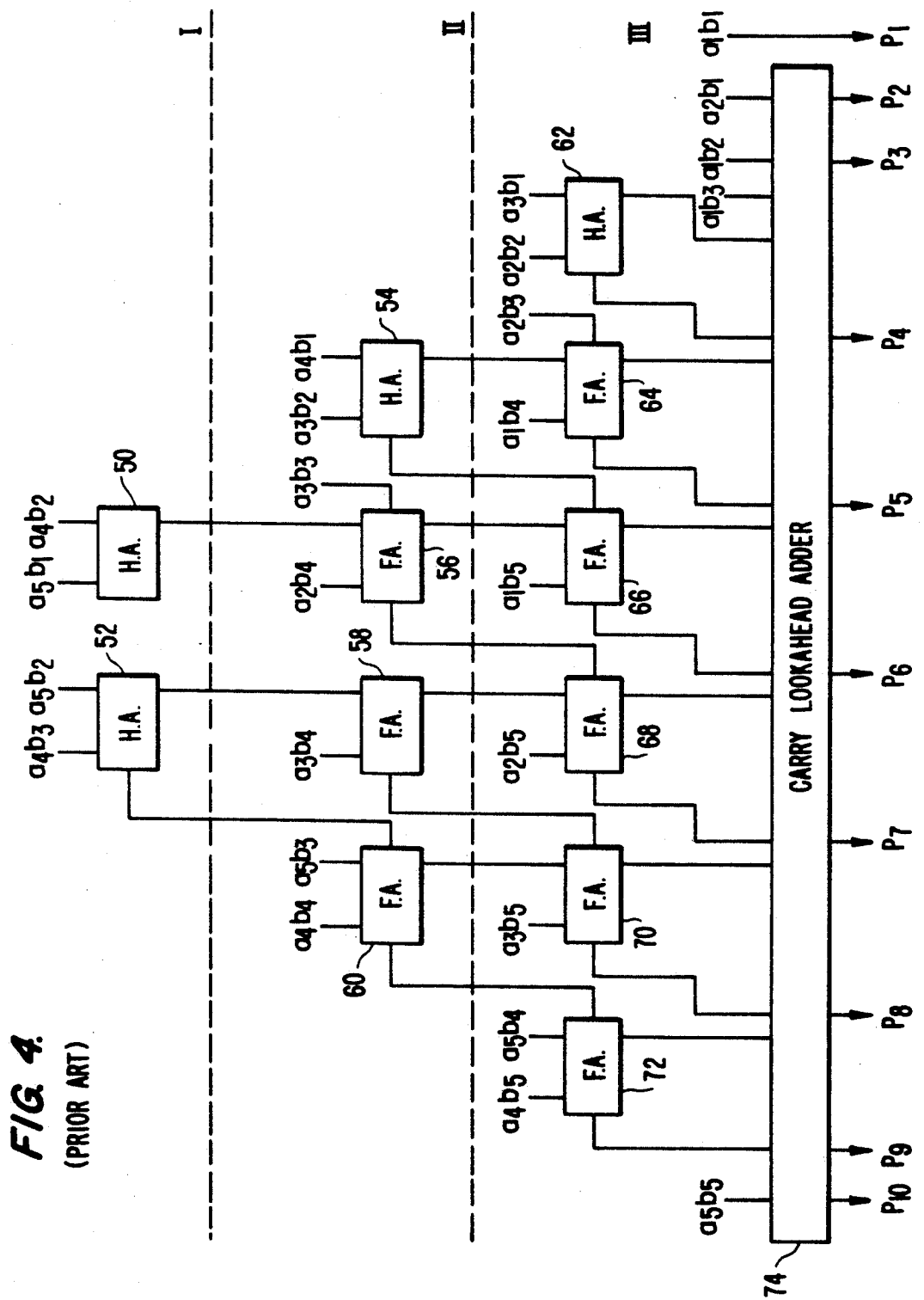
FIG. 4 is a block diagram of another conventional method for summand matrix reduction.

The binary multiplier circuit of the present invention utilizes an increased number of half adders as compared to the reduction schemes illustrated in FIGS. 3 and 4. This scheme is advantageous since an increased number of half adders reduces the propagation delay associated with the overall summand reduction and since the use of half adders reduces the area required on a circuit device for the gate layout and reduces the power dissipated by the multiplier circuit.

The reduction scheme of the present invention, has been determined, through trial and error, to require only $M \times N - 2N - 2M + 3$ full adders and $M-1$ half adders where M is equal to the number of bits of the multiplier and N is equal to the number of bits of the multiplicand. Only one half adder circuit is used to reduce each of columns 3 through M and column $N+1$ of the original summand matrix under this scheme, assuming the multiplier never has more bits than the multiplicand.

The number of logical levels of reduction equals twice the integer result of the number of rows in the original summand matrix, M divided by three, plus the remainder of the integer division operation, or $2 \times INT(M/3) + REM(M/3)$.

It should be noted that the reduction scheme of the present invention can be used when the original multiplier and multiplicand are represented in two's complement binary encoded format or when they are represented in magnitude binary encoded format. When the multiplicand and multiplier are represented in two's complement binary encoded format, the summand matrix must first be converted by use of "Baugh/Wooley two's complement input logic." For a detailed discussion of the two's complement input logic, see "A Two's Complement Parallel Array Multiplication Algorithm," C. Baugh and B. Wooley, Vol. C-22, No. 12, *IEEE Transactions on Computers* (Dec. 1973). It is difficult to perform two's complement multiplication because the sign, positive or negative, is embedded in the multiplier and multiplicand numbers. Therefore, there will be original summand matrix bits with negative, as well as positive, signs. The Baugh/Wooley algorithm first places all the original summand matrix bits with negative signs in the last two rows of the matrix. The algorithm determined that the signs of $a_n b_i$ for $i = 1, \ldots, m-1$ and $a_i b_m$ for $i-1, \ldots, n-1$ are negative. Then, the algorithm states that, instead of subtracting the original summand matrix bits that have negative signs (i.e., those placed in the last two rows of the summand matrix), the negation of these summand matrix bits can be added. Therefore, the algorithm makes use of the two's complement input logic circuitry to obtain the negation of the summand matrix bits having negative signs.

The two's complement input logic circuit is illustrated in FIG. 6 and includes a two-input AND gate 130 connected to receive two of three original summand matrix bits in a column, B and C, and a two-input exclusive OR gate 132 connected to receive the output of the AND gate and a remaining one of the three original summand matrix bits, bit A. The output from gate 132 is then routed to a later logical level of reduction.

The reduction scheme in the present invention is even more advantageous as the number of bits in the multiplier and multiplicand increase because the multiplier circuit utilizes an efficient gate layout pattern. FIG. 7 represents a positional implementation of the present invention. As illustrated in FIG. 7, the gate layout scheme for the multiplier circuit of FIG. 5 is transformed to a triangular design to minimize crossing of wires and to use circuit device are more efficiently.

The rule for the gate layout is as follows. After determining the full adders and half adders required for each column and for each logical level of reduction, each adder circuit is placed in the uppermost position in its column until it is adjacent to an adder above it or reaches the beginning level of adders on the circuit board. For example, full adder 117 is moved from its place in level II to the starting position because there are no adder circuits above it. Full adder 120 is moved until it reaches full adder 108. Full adder 116 is moved upwards until it is adjacent to full adder 106 and half adder 118 is moved upwards until it is adjacent to full adder 116. Half adder 112 is moved upwards until it is adjacent to full adder 102.

The rule for gate layout takes advantage of the fact that the reduction performed at each level results in a certain amount of delay. Since a subsequent level of reduction requires the results of the prior level of reduction for some of its inputs for its gates, the propagation delay involved with routing any original summand bits to be used as inputs for gates at the subsequent level of reduction can be equal to the delay involved in the reduction of the prior level.

Also, because each logical level of reduction introduces a certain amount of delay, and because the final two rows of bits are produced with a delay that increases progressively from the least significant bit position to the most significant bit position, the least significant columns of the final two rows of numbers may be input to the carry propagating adder while the reduction of the more significant columns is still taking place. The carry propagation delay involved in adding the least significant columns in the adder is overlapped by the progressively increasing delay through the reduction levels in the multiplier.

The placement of the gates as shown in FIG. 7 minimizes the number of necessary wires and wire crossings and allows the inputs to be easily routed to the adder circuits as required. The density of wires can be more evenly distributed throughout the design, thereby resulting in a more even distribution of the loads and more efficient power usage. This rule for gate layout also makes more efficient use of the space on the circuit device and becomes more advantageous as the number of bits in the multiplier and multiplicand increase. The effect of the rule for gate lay-out along with the rules for summand matrix reduction results in a parallel multiplier that can perform a very fast multiplication operation.

FIG. 8 illustrates the presently preferred gate layout design of a $32 \times 32$ bit summand matrix to minimize wire density and time delay. The figure has been turned on its side and what has been described previously as a column appears in FIG. 8 as a row. The topmost row represents the most significant bit position and the bottom row represents the least significant bit position. The number in the lefthand column represents the number of original summand matrix bits in the row to the right of that number. The middle row has the largest number of original summand matrix bits and the rows above it or below the middle row have decreasing numbers of original summand matrix bits. The rows to the right of the lefthand column represent the actual gates to be used.

The logic gates used for a row are used to reduce that bit position of significance. Sum bits resulting from a logical level of reduction are placed in the same row and carry bits are placed in the next most significant row of bit position. The Y's represent a gate at level I with inputs of original summand matrix bits to be converted by Baugh/Wooley two's complement input logic. The Z's represent a gate at level II with inputs of original summand bits and bits resulting from a level I reduction to be input into Baugh/Wooley two's complement input logic. The A's represent AND gates. The 0's represent a full adder at level I with all inputs from original summand matrix bits. The 1's represent a full adder at level II which is connected to receive original summand matrix bits and bits resulting from a level I reduction. The 2's represent a full adder at level III which is connected to receive original summand matrix bits, or bits resulting from a level I reduction, or bits resulting from a level II reduction. The 3's represent a full adder at level IV which is connected to receive either original summand matrix bits, bits resulting from a level I reduction, bits resulting from a level II reduction, or bits resulting from a level III reduction. The 4's represent a full adder at level V which is connected to receive either original summand matrix bits, or bits resulting from reductions at levels I, II, III or IV. The 5's represent a full adder at level VI which is connected to receive either original summand matrix bits, or bits resulting from reductions at levels I, II, III, IV, or V. The 6's represent full adders at level VII which are connected to receive bits from a group including original summand matrix bits, or bits resulting from reductions at levels I, II, III, IV, V, or VI. The 7's represent full adders at level VIII which are connected to receive bits from a group including original summand matrix bits, or bits resulting from reductions at levels 1 through VII.

The letters H, I, J, K, L, M and N represent half adders at levels I, II, III, IV, V, VI, and VII respectively, which can receive inputs from a group including original summand matrix bits and bits resulting from any prior logical levels of reduction in a manner similar to that described above with respect to the full adders.

Although the previous description of the summand matrix reduction scheme of the present invention has explained the gate placement scheme such that all level I gates are placed first, then all level II gates are positioned, etc., the actual implementation of the 32×32 bit matrix does not follow this pattern. As shown in FIG. 8, within a particular row, the gate level numbers do not always increase numerically. At the Mth row and Nth column, additional Baugh/Wooley two's complement input logic is required for sign manipulation. This additional logic requires a slight change in the reduction scheme in the pattern of half adders used.

The practical considerations ,of fitting the multiplier circuit logic onto a circuit device may necessitate that the corners of the triangle be broken off. However, the center of the triangle, where the density of the wires is greatest and the time delay is longest, remains intact within the chip. The triangular implementation is nevertheless desirable as it was shown through trial and error to lead to a reduction in wire density and time delay.

The 32×32 bit summand matrix requires eight logical levels of reduction when the reduction scheme of the present invention is used. When the rule for the gate layout of the present invention is used, the summand matrix can be reduced to two addends in five nanoseconds, assuming that the multiplier circuit is implemented in the present state-of-the-art ECL circuitry. This represents a significant increase in speed from the prior reduction schemes. The gate layout could become quite complicated with such a large number of original summand matrix bits. However, by first calculating the logical levels of reduction and then placing gates in this triangular layout design, the binary multiplier circuit can be implemented easily and efficiently with a minimal amount of wires and an easy routing scheme for the input bits.

As illustrated in FIGS. 5 and 7, the binary multiplier circuit of the present invention utilizes more half adders than the schemes of FIGS. 3 and 4, and, as shown in FIG. 7, can be implemented easily and efficiently with a minimal amount of wires and an easy input routing scheme. The design and gate layout of the binary multiplier circuit of the present invention increases the speed at which binary multiplication may be performed and becomes advantageous as the number of bits of the multiplier and multiplicand increase.

It will be apparent to those skilled in the art that various modifications and variations can be made in the method and apparatus of the present invention without departing from the scope or spirit of the invention. Thus, it is intended that the present invention cover the modifications and variations of this invention provided that they come within the scope of the appended claims and their equivalents.

We claim:

1. A binary multiplier circuit for obtaining a product of an M-bit multiplier and an N-bit multiplicand, comprising:

binary multiplier means, having inputs connected to receive said multiplier and said multiplicand, for producing a summand matrix having $M \times N$ original summand matrix bits and having M rows and $M+N$ columns, the columns each representing a different bit position in said product and being arranged in significance according to increasing bit positions of said product;

reduction circuit means, coupled to said binary multiplier means, for producing two addends from said summand matrix bits, said reduction circuit means including a first level adder circuit coupled to receive said original summand matrix bits, said first lever adder circuit including a first set of full adders each corresponding to a selected one of the columns of said summand matrix having three or more original summand matrix bits, except for the one of said columns representing the least significant bit position with only three original summand matrix bits, each of the full adders being connected to receive three different original summand matrix bits from the corresponding column and including means for producing a sum bit for that column and a carry bit for the column representing the next most significant bit position, and a first set of half adders each corresponding to a selected one of the columns of said summand matrix initially having more than three original summand matrix bits and having exactly two original summand matrix bits not connected to one of said full adders in said first set of full adders, and for the one of said columns representing the least significant bit position with only three original summand matrix bits, said half adders each being connected to receive two different original summand matrix bits from the corresponding column and including means for producing a sum bit for that column and a carry bit for the column representing the next most significant bit position, and an intermediate level adder circuit coupled to receive either original summand matrix bits not received by said first set of half adders or full adders, or sum and carry bits from said first set of full adders and half adders, said intermediate level adder circuit being organized into a plurality of different levels and receiving column bits including, for a corresponding column and level, the original summand matrix bits not received by the first set of half or full adders and sum and carry bits which were not inputs at a prior level, said intermediate level adder circuit including a plurality of full adders each corresponding to one of said levels and to a selected one of said columns having three or more column bits, except for the one of said columns at the corresponding level representing the least significant bit position with only three column bits, each of the full adders at each of said levels being connected to receive three column bits for the corresponding column and including means for producing a sum bit for that column and a carry bit for the column representing the next most significant bit position, and a plurality of half adders each corresponding to one of said levels and to a selected one of the columns for which, at each of said intermediate levels, at least one of said plurality of full adders from said first set or from said intermediate level adder circuit corresponds to that column and exactly two bits remain unconnected to any of said full adders, and also corresponding to the one of said columns at each level representing the least significant bit position for which only three bits remain, said half adders each being connected to receive two column bits for the corresponding column, each of said plurality of half adders including means for producing a sum bit for that column and a carry bit for the column representing the next most significant bit position; and full carry-propagating adder means, receiving as inputs the addends which are output from said intermediate level adder circuit, for producing said product.

2. The binary multiplier circuit of claim 1 wherein the number of full adders is $M \times N - 2N - 2M + 3$.

3. The binary multiplier circuit of claim 1 wherein the number of half adders is $M - 1$.

4. The binary multiplier circuit of claim 1 wherein only one half adder circuit is used to reduce each of columns 3 through M and column $N+1$ of said summand matrix.

5. The binary multiplier circuit of claim 1 wherein the binary multiplier means includes a circuit which performs a logical AND operation on each different combination of bits of said multiplier and said multiplicand.

6. The binary multiplier circuit of claim 1 wherein said multiplier value and said multiplicand value are represented in two's complement binary-encoded format.

7. The binary multiplier circuit of claim 1 wherein said multiplier value and said multiplicand value are represented in magnitude binary-encoded format.

8. The binary multiplier circuit of claim 1 further including a plurality of two's complement input circuits, each of said plurality of two's complement input circuits including a two-input AND gate, connected to receive two of three original summand matrix bits as inputs, and a two-input exclusive OR gate connected to receive as inputs the output of said corresponding AND gate and a remaining one of said three original summand matrix bits.

* * * * *